(12) United States Patent
Thanhofer et al.

(10) Patent No.: US 7,997,539 B2
(45) Date of Patent: Aug. 16, 2011

(54) DEVICE AND METHOD FOR TWISTING AND CLAMPING MOVEABLE FLAPS

(75) Inventors: Helmut Thanhofer, Poing (DE);
Helmut Janker, Bruckmuehl (DE);
Manfred Palik, Geretsried (DE)

(73) Assignee: Eads Deutschland GmbH, Ottobrunn (DE)

( * ) Notice: Subject to any disclaimer, the term of this patent is extended or adjusted under 35 U.S.C. 154(b) by 709 days.

(21) Appl. No.: 12/061,266

(22) Filed: Apr. 2, 2008

(65) Prior Publication Data
US 2008/0258015 A1    Oct. 23, 2008

(30) Foreign Application Priority Data

Apr. 18, 2007   (DE) .......................... 10 2007 018 189

(51) Int. Cl.
*B64C 13/14*   (2006.01)
(52) U.S. Cl. ...................................................... 244/224
(58) Field of Classification Search ................ 244/99.2, 244/99.3, 99.4, 99.9
See application file for complete search history.

(56) References Cited

U.S. PATENT DOCUMENTS

| | | | |
|---|---|---|---|
| 2,932,473 A * | 4/1960 | Kass et al. | ............... 244/90 R |
| 3,410,583 A | 11/1968 | Altmann | |
| 3,731,546 A | 5/1973 | MacDonald | |
| 4,691,582 A * | 9/1987 | Weyer | ............... 74/409 |
| 4,834,326 A | 5/1989 | Stache | |
| 2007/0018039 A1* | 1/2007 | Hillen et al. | ............... 244/99.2 |
| 2007/0051847 A1* | 3/2007 | Quitmeyer et al. | ........... 244/99.2 |
| 2007/0152098 A1* | 7/2007 | Sheahan et al. | ................ 244/49 |

FOREIGN PATENT DOCUMENTS

| | | |
|---|---|---|
| DE | 1 283 603 | 11/1968 |
| DE | 22 46 570 | 6/1973 |
| DE | 37 02 294 | 4/1988 |

* cited by examiner

*Primary Examiner* — Tien Dinh
*Assistant Examiner* — Keith Dixon
(74) *Attorney, Agent, or Firm* — Greenblum & Bernstein, P.L.C.

(57) ABSTRACT

The invention relates to a device for twisting and clamping a second flap moveable about a rotational axis with respect to a first flap. A device includes a twisting device arranged on the first flap including a drivable shaft rotatable about the rotational axis and a catch connected to the second flap. The device also includes a clamping device including a clamping sleeve arranged along the rotational axis.

20 Claims, 2 Drawing Sheets

DEVICE AND METHOD FOR TWISTING AND CLAMPING MOVEABLE FLAPS

CROSS-REFERENCE TO RELATED APPLICATIONS

The present application claims priority under 35 U.S.C. §119 of German Patent Application No. 10 2007 018 189.4, filed on Apr. 18, 2007, the disclosure of which is expressly incorporated by reference herein in its entirety.

BACKGROUND OF THE INVENTION

1. Field of the Invention

The invention relates to a device and method for twisting and clamping a second flap (e.g., a control flap) about a rotational axis with respect to a first flap (e.g., a wing).

2. Discussion of Background Information

Hinges are known as a device for twisting two moveable flaps around a rotational axis. Hinges usually comprise two bushes that are respectively fixedly connected to a flap, and an axis that connects the two bushes along the rotational axis. A disadvantage with known hinges is locking the moveable flaps into position at a predetermined angle to one another. This can usually be carried out by using threaded connections through a bush and the axis or corresponding brackets connecting the two flaps.

Devices for twisting moveable flaps are known in aviation, e.g., with a wing/landing flap arrangement. Such arrangements are characterized by a complicated structure of several levers and joints that connect the wing to the flap. These arrangements are usually driven by hydraulic cylinders or by an electric motor with a high torque. The motor is able to block the lever-joint structure through the high torque, thus managing to lock the flap into position at a predetermined angular position to the wing.

In model construction with, e.g., aircraft, ships etc., small lever constructions, rotary shafts or the like are used, which are driven by servo motors arranged in the fuselage or wing. These servo motors are usually designed such that they can bear the external forces acting on the flaps or control surfaces. A stepless adjustment of the flaps is thus possible. Locking the flaps into a specific angular position is carried out by the torque of the servo motor.

In the case of wind tunnel models, however, the problem occurs that even the smallest lever constructions usually cannot be realized due to the small space available. It is also often impossible to install suitable servo motors due to the small amount of space available in the fuselage of the wind tunnel model. Usually, in the case of wind tunnel models, the flap positions to be examined are manually adjusted with the flap being fixed in the corresponding position with threaded connections. A stepless adjustment of the flap is scarcely possible in this manner. In wind tunnel experiments this disadvantageously results in switching on and off and opening the wind tunnel for every position to be examined.

SUMMARY OF THE INVENTION

Embodiments of the invention comprise a device with which a stepless twisting and clamping of two flaps that are moveable with respect to one another is easily possible, even if there is little space available.

According to aspects of the invention, there is a device for twisting and clamping a second flap moveable about a rotational axis with respect to a first flap. The device comprises a twisting device and a clamping device. The clamping device has a clamping sleeve that can be tensioned against the first flap and second flap. Alternatively, the clamping sleeve may be tensioned against the second flap and supported against the first flap. Alternatively, the clamping sleeve may be tensioned against the first flap and supported against the second flap. The clamping sleeve may be arranged in the rotational axis. Moreover, the twisting device includes a drivable shaft that may be pivoted about the rotational axis, the twisting device being arranged on one of the first or second flaps and having a catch connected to the other of the first or second flaps, respectively.

According to further aspects of the invention, the clamping device has a clamping sleeve arranged in the rotational axis. This clamping sleeve can be tensioned against the first flap, e.g., the wing, or at the same time against the first flap and the second moveable flap, e.g., landing flap. A mandrel is provided in order to tension the clamping sleeve against the flap or flaps, which mandrel can be detachably inserted into the clamping sleeve. The insertion of the mandrel causes the clamping sleeve to expand, causing the clamping sleeve to be tensioned against the flap or flaps.

In implementations of the invention, and as described herein, the first flap may comprise a wing and the second moveable flap may comprise a control surface. However, the invention is not limited to this implementation, and the first and second flaps may be any suitable moveable flaps.

In embodiments of the invention, the twisting device can be attached to the wing or to the control surface. In a specific embodiment, for reasons of weight, the shaft of the twisting device is advantageously attached to and supported on the wing. According to further embodiments, the twisting device has a drivable shaft supported around the rotational axis. According to even further embodiments, the shaft is attached to the control surface (e.g., if the shaft is supported on the wing) or to the wing (e.g., if the shaft is supported on the control surface) via a catch. This connection can be, e.g., a rivet connection, a pin connection or a threaded connection, which produces a rigid yet detachable connection between the shaft and the control surface or wing.

According to a first aspect of the invention, there is a device for twisting and clamping a second flap moveable about a rotational axis with respect to a first flap. The device includes a twisting device arranged on the first flap including a drivable shaft rotatable about the rotational axis and a catch connected to the second flap. The device also includes a clamping device including a clamping sleeve arranged along the rotational axis.

The clamping sleeve may be structured and arranged to be tensioned against the first flap and the second flap. The clamping sleeve may be structured and arranged to be tensioned against the second flap and supported against the first flap. The clamping sleeve may be structured and arranged to be tensioned against the first flap and supported against the second flap.

The clamping device may further comprise: a linear drive having a spindle; a mandrel structured and arranged to be inserted into the clamping sleeve; and a rotation locking device connected to the clamping sleeve and supportable on the first flap. The linear drive may be a ball-type linear drive.

The clamping device may further comprise a ball sliding joint including a joint housing and a ball supported in the joint housing. The ball may be connected to the mandrel and the joint housing connected to the linear drive. The ball may be connected to the linear drive and the joint housing connected to the mandrel.

The device may further comprise an electric motor comprising a drive shaft that drives the linear drive. Also, the clamping device may further comprise a drive joint comprising a drive housing and a joint slidably supported in the drive housing in a longitudinal direction of the drive housing and in a torsionally resistant manner relative to the drive housing. The joint may be connected to the spindle and the drive housing connected to the electric motor, or the joint may be connected to the electric motor and the drive housing connected to the spindle.

The drive shaft of the electric motor, the drive joint, the linear drive, the ball sliding joint, the mandrel, and the clamping sleeve may be arranged in the rotational axis.

Alternatively, the drive shaft of the electric motor, the drive joint, the linear drive, the ball sliding joint, the mandrel, and the clamping sleeve are arranged in a line outside the rotational axis. The device may further comprise a structure arranged to convert a linear motion of the linear drive along the line to a linear motion of the mandrel along the rotational axis. The mandrel may be arranged in the rotational axis.

The twisting device may comprise an electric motor that drives the drivable shaft.

The device may further comprise a zero position determining device structured and arranged to determine a zero position of the first flap relative to the second flap.

Also, the device may further comprise an angle determining device structured and arranged to determine an angle of rotation of the drivable shaft.

According to a second aspect of the invention, there is a method for twisting and clamping a second flap moveable about a rotational axis with respect to a first flap. The method comprises pivoting the second flap relative to the first flap about the rotational axis using a drivable shaft rotatable about the rotational axis and a catch connected to the second flap, and clamping the second flap relative to the first flap using a clamping sleeve arranged along the rotational axis.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
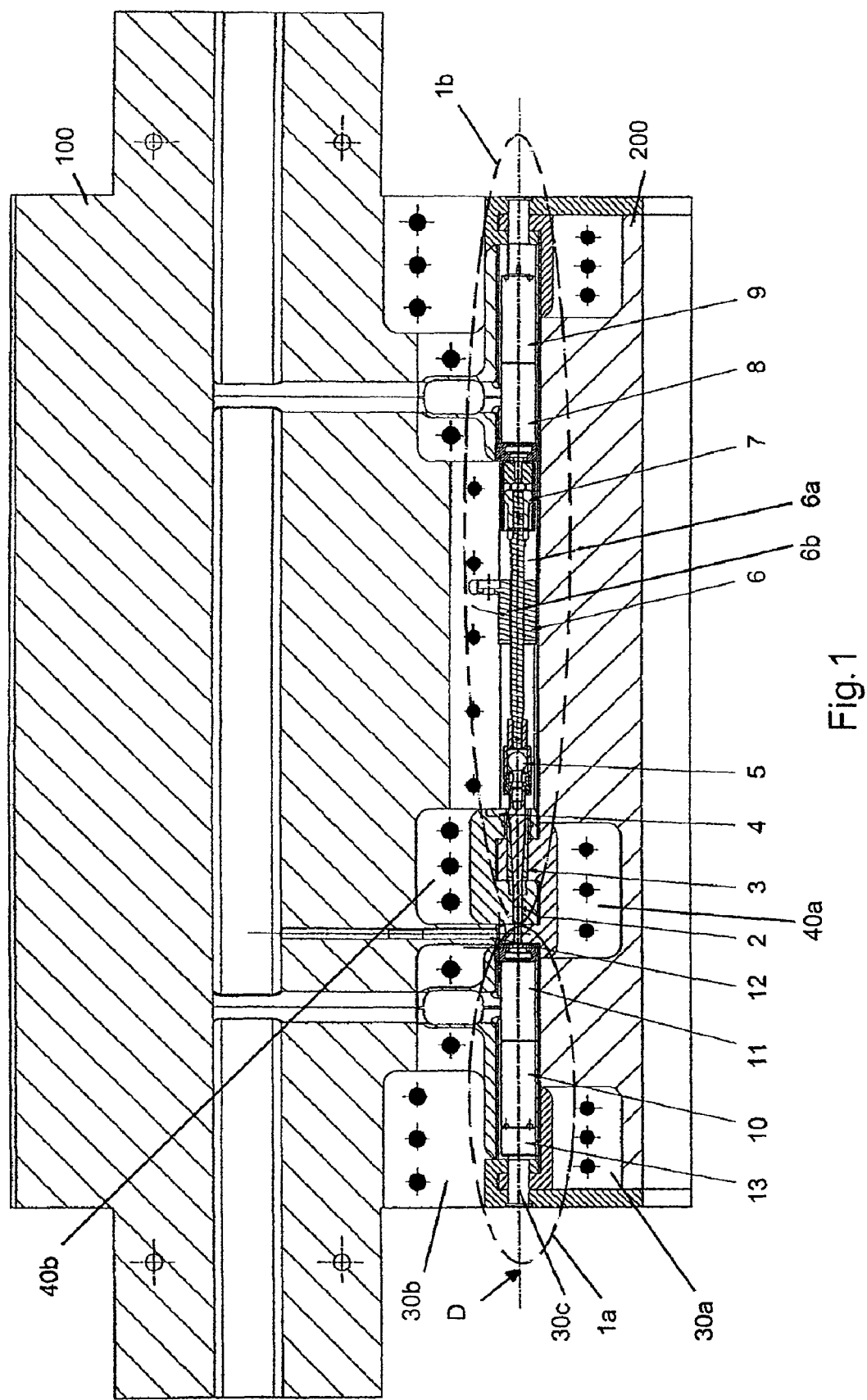
FIG. 1 shows a sectional representation through a wing/control surface arrangement with a device according to aspects of the invention for twisting and clamping the control surface in an exemplary embodiment.
Figure 2:
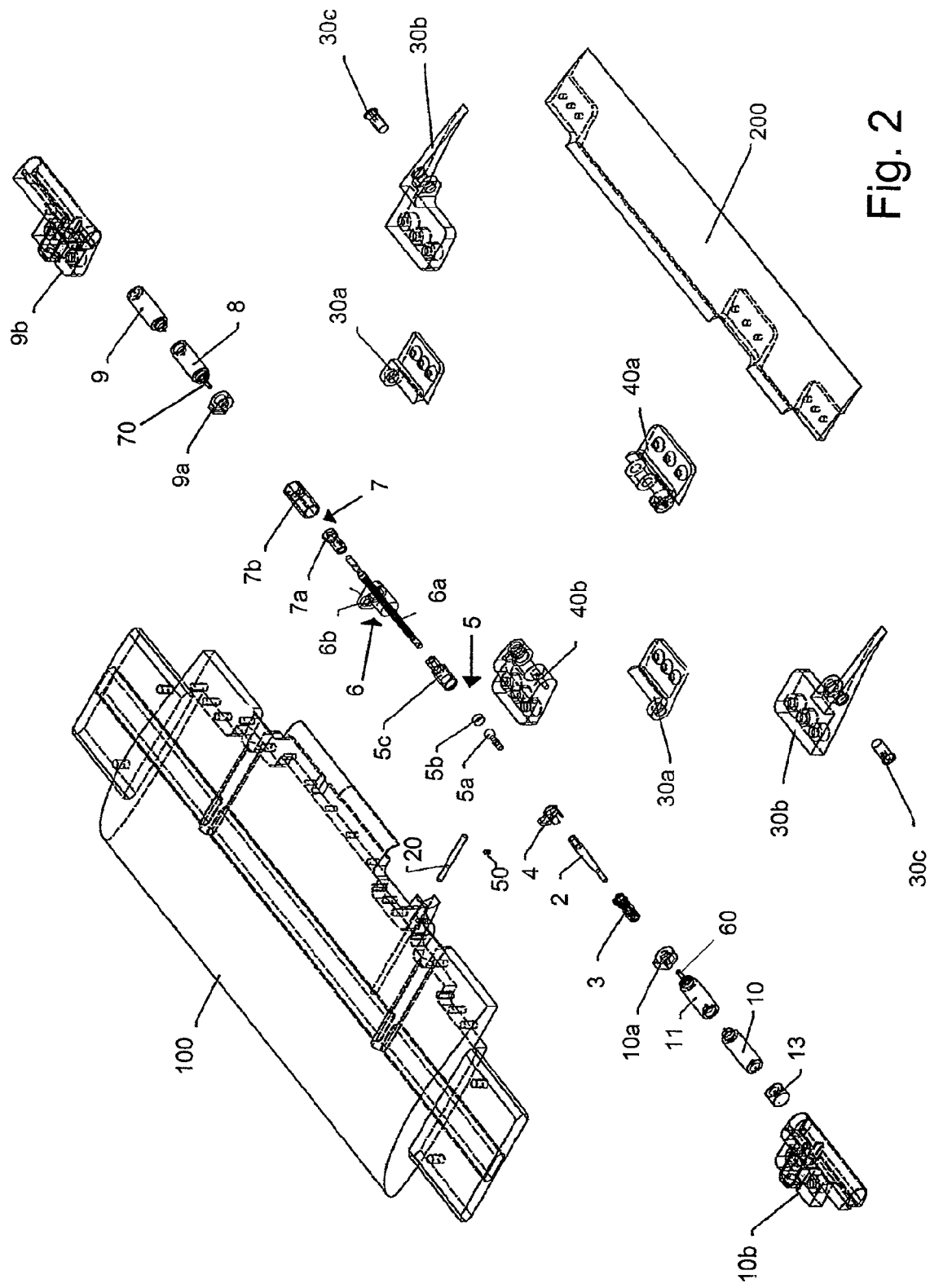
FIG. 2 shows an exploded view of a wing/control surface arrangement with a device according to aspects of the invention for twisting and clamping the control surface in an exemplary embodiment.

FIG. 1 shows a sectional representation through a wing/control surface arrangement with a clamping and twisting device according to aspects of the invention. In FIG. 2, a device according to aspects of the invention is shown as an exploded view.

FIGS. 1 and 2 show a clamping and twisting device 1b, 1a, which is respectively suspended on the wing 100, which arrangement is preferable for mechanical reasons. However, in alternative embodiments, the clamping and twisting device 1b, 1a are suspended in whole or in part on the control surface 200. In the latter case, the greater leverage forces occurring due to the greater weight of the control surface 200 may be taken into account in the design, e.g., of the servo motors 9, 10 and/or or the gears 8, 11.

FIGS. 1 and 2 show a twisting device 1a and a clamping device 1b respectively arranged along the rotational axis D. However, in alternative embodiments, the devices 1a, 1b are arranged such that parts of the clamping and/or twisting device 1b, 1a lie outside the rotational axis D. This can be carried out, e.g., using suitable joints, described in more detail below.

According to aspects of the invention, the clamping device 1b is based on the principle that a mandrel 2 is moved into a clamping sleeve 3 for clamping. The clamping sleeve 3 is thus expanded and pressed against the control surface 200 or against the control surface 200 and the wing 100. In specific embodiments, the clamping sleeve 3 is pressed against a collet chuck fixedly connected to the control surface 200 and the wing 100. Clamping can also be carried out by a loose clamping sleeve 3 that presses at the same time against the wing 100 and the control surface 200.

In embodiments, the collet chuck comprises a tensioning element 40a on the control surface and a tensioning element 40b on the wing, each of which tensioning elements 40a, 40b has a bush with a through hole along the rotational axis D. The two tensioning elements 40a, 40b are respectively attached to the wing 100 and to the control surface 200 (e.g., by a threaded connection) and have recesses. In this manner, the two tensioning elements 40a, 40b engage with one another in the appropriate structure of wing 100 and control surface 200, so that the bores in the bushes of the two tensioning elements 40a, 40b form a continuous bore along the rotational axis D. Accordingly, the bush of the one tensioning element 40a engages in the recess of the other tensioning element 40b.

In one embodiment, the clamping sleeve 3 is located in the bore of the bush of the tensioning element 40a attached to the control surface 200. In another embodiment, the clamping sleeve 3 may alternatively be arranged in a region of the continuous bore so that during the expansion of the clamping sleeve 3 it is tensioned against the control surface 200 and the wing 100. In this manner, a reduction of the play occurring in the rotational axis D in the tensioned state of the clamping sleeve 3 is achieved.

In implementations of the invention, the clamping of the clamping sleeve 3 against the control surface 200 (or against the wing 100 and the control surface 200) is achieved by a mandrel 2, which, in order to clamp the clamping sleeve 3, is moved into the clamping sleeve 3 up to a predetermined limit stop. The clamping sleeve 3 can be embodied, for example, as a hollow cylindrical sleeve with a closed sheath. In the region of the conical ends, the sleeve 3 is elastically deformed during tensioning. In additional embodiments, when greater clamping forces are necessary, the clamping sleeve 3 can also be axially slit in the area of the conical ends or over the entire length in order to render possible greater diameter changes for the clamping operation. The internal profile of the clamping sleeve 3 and the external profile of the mandrel 2 are chosen such that a rotation of the mandrel 2 is prevented by friction when the limit stop is reached.

According to aspects of the invention, a rotation-locking device 4 is installed on the clamping sleeve 3. In embodiments, the rotation-locking device 4 is supported on the wing 100 and prevents the clamping sleeve 3 from rotating about the rotational axis D. A recess, for example, can be provided for this purpose on the wing 100, into which recess the rotation-locking device 4 engages. In a particular embodiment, the rotation-locking device 4 can be a bulge that is embodied on the outside of the clamping sleeve 3.

In an alternative embodiment, the rotation-locking device 4 can be a sleeve element that is connected to the clamping sleeve 3 along the rotational axis D and through which the mandrel 2 can engage. In such a configuration, the inside diameter of the sleeve element is larger than the maximum outside diameter of the mandrel 2.

In an even further embodiment, a rotation-locking device 4 is not employed. In this configuration, the above-described function of the rotation-locking device can be directly carried out instead by the clamping sleeve 3 being additionally tensioned against the tensioning elements 40a and 40b.

In implementations of the invention, the movement of the mandrel 2 is achieved by a ball-type linear drive 6 comprising a threaded spindle 6a with a helical groove and a spindle nut 6b. The ball-type linear drive 6 converts the rotary (e.g., turning) motion of a drive shaft 70 of a servo motor 9 into a translational (e.g., linear) motion.

According to aspects of the invention, the ball-type linear drive 6 is connected at one end to the mandrel 2 via a ball sliding joint 5 and at the other end to the drive shaft 70 of the servo motor 9 via a drive joint 7. By way of the ball sliding joint 5, it is possible to equalize stresses acting radially on the rotational axis D. In this manner, implementations of the invention avoid side tilts of the mandrel 2 while moving into the clamping sleeve 3 (e.g., through forces acting radially on the rotational axis, which forces can be transferred to the drive shaft 70 of the servo motor 9).

In embodiments, the ball sliding joint 5 comprises a joint ball 5a held in a joint cup 5b in a moveable manner, the joint ball 5a and joint cup 5b being located in a joint housing 5c. The joint ball 5a is connected to the mandrel 2, and the joint cup 5b to the ball-type linear drive 6, or vice versa.

In embodiments, a servo motor 9 is attached to the wing 100 in order to drive the clamping device 1b. The servo motor 9 is connected to the drive joint 7 via a gear 8, e.g., a planetary gear. The arrangement of servo motor 9, which is inserted in a motor housing 9b, and gear 8 is supported by an engine bearer 9a, which is supported on the wing 100.

In particular embodiments, the drive joint 7 comprises a drive housing 7b and a joint 7a slidably supported in the longitudinal direction in a torsionally resistant manner in the drive housing 7b. The drive housing 7b is connected to the drive shaft 70 of the servo motor 9, and the joint 7a is connected to the ball-type linear drive 6.

In a further particular embodiment of the invention, the internal contour of the drive housing 7b corresponds to the external contour of the joint 7a. For example, the drive housing 7b can have an internal contour of a hexagon in which the joint 7a with an external contour of a hexagon can be guided in a torsionally resistant manner. The joint 7a is thereby guided between a first and second position in the drive housing 7b. The drive joint 7 allows for the linear movement of the mandrel 2 to be compensated by the ball-type linear drive 6, so that a continuous drive is possible with simultaneous linear movement of the mandrel 2.

FIG. 1 shows a clamping device according to the invention, in which all of the components are arranged along the rotational axis D. In alternative embodiments, the drive shaft 70 of the electric motor 9, the electric motor 9, the drive joint 7, the ball-type linear drive 6 and the ball sliding joint 5 are arranged in a line outside the rotational axis D. For example, in the latter configuration, a flexible shaft (not shown) can be arranged between the mandrel 2 and the ball-type linear drive 6 in order to move the mandrel 2 connected to the ball-type linear drive 6 in a linear motion.

In embodiments, the control surface 200 is supported at the two narrow ends on the wing 100 by a respective bearing element (e.g., fitting) 30a, 30b. These bearing elements 30a, 30b are similar to the tensioning elements 40a, 40b, except that the bearing elements 30a, 30b have a bearing bolt 30c in the continuous bores through the part of the fitting on the control surface and on the wing.

In further embodiments, all of the components of the clamping device 1b, which are connected to the drive shaft 70, are freely rotatable in the unclamped state.

FIGS. 1 and 2 also show a twisting device 1a according to aspects of the invention. In embodiments, the twisting device 1a comprises a servo motor 10 with a drive shaft 60. In further embodiments, the servo motor 10 is inserted in a motor housing 10b, and the twisting device 1a is attached to the wing 100 and supported by an engine bearer 10a. In even further embodiments, the drive shaft 60 is arranged along the rotational axis D and the servo motor 10 is arranged in the rotational axis D. In alternative embodiments, the servo motor 10 is positioned outside the rotational axis D and the drive shaft 60 is driven, e.g., via a flexible shaft.

According to aspects of the invention, a corresponding form closure or a catch 50 (e.g., a screw or a setscrew) is provided to transfer the rotary motion of the drive shaft 60 to the control surface 200. The catch 50 connects the drive shaft 60 to the control surface 200, such that the control surface 200 may be rotated about the rotational axis D through the rotation of the drive shaft 60 driven by the servo motor 10.

In additional implementations, the twisting device 1a comprises an angle determining device 13, connected to the servo motor 10, with which the angle of rotation of the drive shaft 60 can be determined.

As shown in FIG. 2, a zero position determining device 20 may be provided to determine the zero position of the wing 100 to the flap 200. For example, the zero position determining device 20 may comprise an inductive or optical proximity switch in the wing 100. In embodiments, a corresponding device is located on the control surface 200 at the zero position of the control surface 200 relative to the wing 100 opposite the zero position determining device 20 (e.g., proximity switch). The corresponding device triggers the zero position determining device 20 (e.g., proximity switch). The zero position determining device 20 can be, e.g., fixedly connected to the drive shaft 60 of the twisting device 1a. The zero position determining device 20 can also be, e.g., a sleeve fixedly connected to the drive shaft 60 or the ball-type linear drive 6, which sleeve has a light/dark transition with an optical proximity switch or a transition of a non-magnetic material to a magnetic material with an inductive proximity switch.

In particular embodiments, the servo motor 10 (e.g., electric motor) includes a device that causes the electric motor 10 to switch off when the torque exceeds a predetermined value. In this manner, the destruction of the servo motor 10 and the twisting device 1a is thereby prevented when the clamping device 1b is brought into a position in which the mandrel 2 presses against the clamping sleeve 3 and a clamping is achieved between the control surface 200 and the wing 100.

During operation of the device according to aspects of the invention, the clamping device 1b is released by the mandrel 2 being moved out of the clamping sleeve 3. The control surface 200 is placed in the desired angular position by controlling the servo motor 10 of the twisting device 1a. In embodiments, the control surface 200 is brought into the zero position until the zero position determining device 20 (e.g., proximity switch) is tripped. In order to avoid a multivaluedness, this zero position can lie outside the nominal range of adjustment (e.g., −30° to 30°) at, e.g., −40°. After the zero position has been determined, the control surface 200 is moved beyond the other end of the nominal range of adjustment to avoid hysteresis errors (e.g., equalization of the gear backlash). Subsequently, the final angular position is adopted.

The nominal range of adjustment is understood to be that angular region which the moveable second flap (e.g., control flap 200) is to cover with respect to the first flap (e.g., wing 100). The zero position can be established either above or below this nominal range of adjustment.

After adjustment of the flap (e.g., control flap 200) has been completed, the clamping device 1b is activated, such that the mandrel 2 is pressed into the clamping sleeve 3 with defined force. In embodiments, the clamping motor (e.g., servo motor 9) is limited to a maximum current strength and thus to a maximum torque. The mandrel position achieved thereby serves as a zero reference of the clamping device 1b. According to aspects of the invention, a fault is defined and indicated if this zero reference value deviates by a certain value during the next closing operation.

In implementations of the invention, the electric components of the device according to the invention can be controlled electronically over a wide distance. This control can be carried out wirelessly. In further implementations, the control hardware is located partially or entirely in the immediate vicinity of the twisting and clamping devices 1a, 1b.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A device for twisting and clamping a second flap moveable about a rotational axis with respect to a first flap, comprising:
    a twisting device arranged on the first flap comprising a drivable shaft rotatable about the rotational axis and a catch connected to the second flap; and
    a clamping device comprising a clamping sleeve arranged along the rotational axis,
    wherein the clamping device further comprises:
        a linear drive having a spindle;
        a mandrel structured and arranged to be insertable into the clamping sleeve; and
        a rotation locking device connected to the clamping sleeve and supportable on the first flap.

2. The device of claim 1, wherein the clamping sleeve is structured and arranged to be tensioned against the first flap and the second flap.

3. The device of claim 1, wherein the clamping sleeve is structured and arranged to be tensioned against the second flap and supported against the first flap.

4. The device of claim 1, wherein the clamping sleeve is structured and arranged to be tensioned against the first flap and supported against the second flap.

5. The device of claim 1, wherein the linear drive is a ball-type linear drive.

6. The device of claim 1, wherein the clamping device further comprises a ball sliding joint including a joint housing and a ball supported in the joint housing.

7. The device of claim 6, wherein the ball is connected to the mandrel and the joint housing is connected to the linear drive.

8. The device of claim 6, wherein the ball is connected to the linear drive and the joint housing is connected to the mandrel.

9. The device of claim 6, further comprising an electric motor comprising a drive shaft to drive the linear drive.

10. The device of claim 9, wherein the clamping device further comprises a drive joint comprising a drive housing and a joint slidably supported in the drive housing in a longitudinal direction of the drive housing and in a torsionally resistant manner.

11. The device of claim 10, wherein the joint is connected to the spindle and the drive housing is connected to the drive shaft of the electric motor.

12. The device of claim 10, wherein the joint is connected to the drive shaft of the electric motor and the drive housing is connected to the spindle.

13. The device of claim 12, wherein the drive shaft of the electric motor, the drive joint, the linear drive, the ball sliding joint, the mandrel, and the clamping sleeve are arranged in the rotational axis.

14. The device of claim 12, wherein the drive shaft of the electric motor, the drive joint, the linear drive, and the ball sliding joint, are arranged in a line outside the rotational axis.

15. The device of claim 14, further comprising a structure arranged to convert a linear motion of the linear drive along the line to a linear motion of the mandrel, which is not located on the line.

16. The device of claim 15, wherein the mandrel is arranged in the rotational axis.

17. The device of claim 1, wherein the twisting device comprises an electric motor that drives the drivable shaft.

18. The device of claim 1, further comprising a zero position determining device structured and arranged to determine a zero position of the first flap relative to the second flap.

19. The device of claim 1, further comprising an angle determining device structured and arranged to determine an angle of rotation of the drivable shaft.

20. A method for twisting and clamping a second flap moveable about a rotational axis with respect to a first flap, comprising:
    pivoting the second flap relative to the first flap about the rotational axis using a drivable shaft rotatable about the rotational axis and a catch connected to the second flap; and
    clamping the second flap relative to the first flap using a clamping device comprising a clamping sleeve arranged along the rotational axis, wherein the clamping device further comprises:
  a linear drive having a spindle;
  a mandrel structured and arranged to be insertable into the clamping sleeve; and
  a rotation locking device connected to the clamping sleeve and supportable on the first flap.

* * * * *